US009980188B2

(12) United States Patent
Choi et al.

(10) Patent No.: US 9,980,188 B2
(45) Date of Patent: *May 22, 2018

(54) USER MOBILITY CONTROL FOR HETEROGENEOUS WIRELESS NETWORKS

(71) Applicant: MARVELL WORLD TRADE LTD., St. Michael (BB)

(72) Inventors: Jihwan P. Choi, Daegu (KR); Yakun Sun, Sunnyvale, CA (US); Ying Cai, Campbell, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/922,758

(22) Filed: Oct. 26, 2015

(65) Prior Publication Data

US 2016/0044557 A1    Feb. 11, 2016

Related U.S. Application Data

(63) Continuation of application No. 13/961,634, filed on Aug. 7, 2013, now Pat. No. 9,173,151.

(Continued)

(51) Int. Cl.
*H04W 36/32* (2009.01)
*H04W 36/04* (2009.01)
(Continued)

(52) U.S. Cl.
CPC ....... *H04W 36/04* (2013.01); *H04W 36/0083* (2013.01); *H04W 36/32* (2013.01); *H04W 36/14* (2013.01)

(58) Field of Classification Search
CPC . H04W 36/32; H04W 36/04; H04W 36/0083; H04W 36/14
(Continued)

(56) References Cited

U.S. PATENT DOCUMENTS 5,548,806 A   8/1996   Yamaguchi et al.
6,006,093 A   12/1999  Aalto et al.
(Continued)

FOREIGN PATENT DOCUMENTS

CN   1568085 A    1/2005
CN   101237680 A  8/2008
(Continued)

OTHER PUBLICATIONS

Communication Pursuant to Article 94(3) EPC in European Patent Application No. 13 752 988.9-1857, dated Dec. 9, 2016 (6 pages).
(Continued)

*Primary Examiner* — Sam Bhattacharya

(57) ABSTRACT

In a wireless network including a first cell and a second cell, it is determined whether a measure of mobility of a user device meets a mobility criterion, and it is determined whether a size of the second cell meets a cell size criterion. When it is determined that (i) the measure of mobility of the user device meets the mobility criterion and (ii) the size of the second cell meets the cell size criterion, the user device is prevented from being switched from the first cell to the second cell, or at least one of (i) a handover parameter or (ii) a cell reselection parameter is adjusted in order to change a probability that the user device will switch from the first cell to the second cell.

26 Claims, 7 Drawing Sheets

Related U.S. Application Data

(60) Provisional application No. 61/680,636, filed on Aug. 7, 2012.

(51) Int. Cl.
*H04W 36/00* (2009.01)
*H04W 36/14* (2009.01)

(58) Field of Classification Search
USPC ......... 455/434, 436, 441, 442; 370/329, 331
See application file for complete search history.

(56) References Cited

U.S. PATENT DOCUMENTS

| | | | |
|---|---|---|---|
| 7,027,816 | B2 | 4/2006 | Kikuma et al. |
| 7,149,477 | B2 | 12/2006 | Ogami |
| 9,008,659 | B1 | 4/2015 | Choi et al. |
| 9,173,151 | B2 | 10/2015 | Choi et al. |
| 2009/0047954 | A1 | 2/2009 | Tenny et al. |
| 2009/0117905 | A1 | 5/2009 | Watanabe et al. |
| 2009/0275334 | A1 | 11/2009 | Xie et al. |
| 2010/0317349 | A1 | 12/2010 | Serravalle |
| 2010/0323662 | A1 | 12/2010 | Dahlen et al. |
| 2011/0250891 | A1 | 10/2011 | Zou et al. |
| 2014/0045495 | A1 | 2/2014 | Deshpande et al. |

FOREIGN PATENT DOCUMENTS

| | | |
|---|---|---|
| CN | 101480084 A | 7/2009 |
| CN | 101931977 A | 12/2010 |
| EP | 2034750 | 3/2009 |
| JP | H10-501393 A | 2/1998 |
| JP | 2002-159055 A | 5/2002 |
| JP | 2004-48528 A | 2/2004 |
| JP | 2004-235725 A | 8/2004 |
| JP | 2009-10989 A | 1/2009 |
| JP | 2010-517341 A | 5/2010 |
| WO | WO-2010/121885 A1 | 10/2010 |
| WO | WO-2011/126932 A1 | 10/2011 |
| WO | WO-2011/155512 A1 | 12/2011 |
| WO | WO-2011/162654 | 12/2011 |

OTHER PUBLICATIONS

"Technical White Paper: Long Term Evolution (LTE): A Technical Overview", Motorola, 2007, 15 pages.
3GPP TS 36.331 V10.5.0, "3rd Generation Partnership Project; Technical Specification Group Radio Access Network; Evolved Universal Terrestrial Radio Access (E-UTRA); Radio Resource Control (RRC); Protocol specification (Release 10)", Mar. 2012, 302 pages.
3GPP TS 36.304 V10.4.0, "3rd Generation Partnership Project; Technical Specification Group Radio Access Network; Evolved Universal Terrestrial Radio Access (E-UTRA); User Equipment (UE) procedures in idle mode (Release 10)", Dec. 2011, 33 pages.
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010, 149 pages.
3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.
3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", Dec. 2010, 32 pages.
3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", Dec. 2010, 42 pages.
3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", Dec. 2010, 297 pages.
3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", Dec. 2011, 296 pages.
3GPP TS 23.203 V10.6.0, "3rd Generation Partnership Project; Technical Specification Group Services and System Aspects; Policy and Charging Control Architecture (Release 10)", Mar. 2012, 131 pages.
International Search Report and Written Opinion for International Application No. PCT/US2013/053985, dated Nov. 6, 2013.
International Preliminary Report on Patentability in International Application No. PCT/US2013/053985, dated Feb. 19, 2015 (9 pages).
Communication pursuant to Article 94(3) EPC in European Patent Application No. 13752988.9, dated Jul. 3, 2017 (5 pages).
Notification of Reasons for Refusal in Japanese Patent Application No. 2015-526676, dated Aug. 15, 2017, with English translation (9 pages).
Search Report in Japanese Patent Application No. 2015-526676, dated Aug. 14, 2017, with English translation (49 pages).
Potevio, "Enhancement to high speed UEs in HetNet," 3GPP TSG-RAN WGS Meeting #78, Prague, pp. 2-3 (May 2012).
Office Action in Chinese Patent Application No. 201380047633.1, dated Nov. 30, 2017, with English translation (11 pages).
Search Report in Chinese Patent Application No. 2013800476331, dated Nov. 30, 2017 Office Action (2 pages).

USER MOBILITY CONTROL FOR HETEROGENEOUS WIRELESS NETWORKS

CROSS-REFERENCE TO RELATED APPLICATION

This application is a continuation of U.S. application Ser. No. 13/961,634, entitled "User Mobility Control for Heterogeneous Wireless Networks," filed Aug. 7, 2013, which claims the benefit of U.S. Provisional Patent Application No. 61/680,636, entitled "User Mobility Control for Heterogeneous Wireless Networks," filed on Aug. 7, 2012. The disclosures of both of the applications referenced above are hereby incorporated by reference herein in their entireties.

FIELD OF TECHNOLOGY

The present disclosure relates generally to wireless networks and, more particularly, to methods and systems for user device handover between cells and user device cell reselection in heterogeneous wireless networks.

BACKGROUND

In cellular networks, mobile user devices (e.g., mobile telephones) typically perform an initial "cell selection" process to identify and select a cell having a base station that is capable of adequately serving the user device. Because user devices may move from area to area, however, the base stations of different cells may become better positioned to communicate with the user devices at different times. Thus, in order to retain a high quality of service, cellular networks typically provide a mechanism for switching which cell serves a user device. When a user device is in active communication with a base station of a serving cell, or "connected," the process of switching cells is typically referred to as cell "handover." Handover is typically initiated by the serving cell issuing a "handover command" to the user device and the target cell. When a user device is in an idle mode (e.g., in a mode in which only overhead data such as paging messages, broadcast parameters, etc., are received from a base station of a serving cell), however, the process is typically referred to as cell "reselection." While cell handover is generally instructed by the network, cell reselection is generally determined by the user device. The cell reselection process is typically initiated by the user device "registering" with the target cell.

In some cellular networks, such as cellular networks arranged according to the 3$^{rd}$ Generation Partnership Project Long Term Evolution (3GPP LTE) Specification, cells are uniform in size, constituting a homogeneous wireless network. However, in future generation mobile communication networks, such as 3GPP Release 10 and beyond, and other types of mobile communication networks, cells may vary in size, constituting heterogeneous wireless networks. Heterogeneous wireless networks may have both macro cells and small cells. Small cells may be pico cells, femto cells, or micro cells. Small cells are typically found inside and/or at the edge of the range of macro cells. The small cells can provide benefits, for example, such as increasing throughput and assisting in network load balancing. For example, if there is a particular area within the range of a macro cell with a high user density, such as a baseball stadium, a small cell can additionally be used in that area.

In homogeneous wireless networks, cell sizes are not considered for handover or reselection decisions. User mobility state is considered, typically based on the number of handovers or cell reselections over a given period of time, and typically handovers are designed to become more aggressive (i.e., criteria for handovers are made more lenient) when a user device is in a high-mobility state. This is because in a homogeneous wireless network aggressive handovers will result in early handovers for better signal quality. Cell reselection is typically done based solely on frequency and signal strength.

SUMMARY

In one embodiment, a method of controlling a switching of a user device from a first cell to a second cell in a wireless network includes: determining whether speed information corresponding to a velocity of the user device meets a threshold that was determined based on a size of the second cell; determining whether the size of the second cell meets a cell size criterion; and when it is determined that (i) the speed information meets the threshold and (ii) the size of the second cell meets the cell size criterion, preventing the user device from being switched from the first cell to the second cell.

In another embodiment, an apparatus comprises a processor configured to: determine whether speed information corresponding to a velocity of a user device meets a threshold, wherein the user device is within a first cell of a wireless network, and wherein the threshold was determined based on a size of a second cell in the wireless network, determine whether the size of the second cell meets a cell size criterion, wherein the second cell is within or adjacent to the first cell in the wireless network, and when it is determined that (i) the speed information meets the threshold and (ii) the size of the second cell meets the cell size criterion, prevent the user device from being switched from the first cell to the second cell.

In yet another embodiment, a method of controlling a switching of a user device from a first cell to a second cell in a wireless network includes: determining whether speed information corresponding to a velocity of the user device meets a threshold that was determined based on a size of the second cell; determining whether the size of the second cell meets a cell size criterion; and when it is determined that (i) the speed information meets the threshold and (ii) the size of the second cell meets the cell size criterion, adjusting at least one of (i) a handover parameter or (ii) a cell reselection parameter in order to decrease a probability that the user device will switch from the first cell to the second cell.

In still another embodiment, an apparatus comprises a processor configured to: determine whether speed information corresponding to a velocity of a user device meets a threshold, wherein the user device is within a first cell of a wireless network, and wherein the threshold was determined based on a size of a second cell in the wireless network, determine whether the size of the second cell meets a cell size criterion, wherein the second cell is within or adjacent to the first cell in the wireless network, and when it is determined that (i) the speed information meets the threshold and (ii) the size of the second cell meets the cell size criterion, adjust at least one of (i) a handover parameter or (ii) a cell reselection parameter in order to decrease a probability that the user device will switch from the first cell to the second cell.

In a further embodiment, a method of controlling a switching of a user device from a first cell to a second cell in a wireless network includes: determining whether speed information corresponding to a velocity of the user device meets a threshold that was determined based on a size of the second cell; determining whether the size of the second cell meets a cell size criterion; and in response to determining that (i) the speed information meets the threshold, and (ii) the size of the second cell meets the cell size criterion, handing over the user device to the second cell.

In yet another embodiment, an apparatus comprises a base station serving a first cell, the base station configured to: determine whether speed information corresponding to velocity of a user device meets a threshold, wherein the threshold was determined based on a size of a second cell in the wireless network, determine whether the size of the second cell meets a cell size criterion, and in response to determining that (i) the speed information meets the threshold, and (ii) the size of the second cell meets the cell size criterion, hand over the user device to the second cell.

At least in some embodiments, and at least in some scenarios, techniques such as disclosed herein help to reduce the frequency of cell handovers or reselections and thus help to reduce overhead signaling, such as handover commands and connection setup requests. Frequent handover commands and cell reselection requests will increase cell detection and measurement activities by users, and thus a reduction in the frequency of cell handovers or cell reselections will help to reduce cell detection and measurement activities by users, at least in some embodiments and/or scenarios. Similarly, at least in some embodiments, and at least in some scenarios, techniques such as disclosed herein help to reduce unnecessary cell handovers or reselections and thus help to reduce overhead signaling, cell detection and measurement activities by users, etc.

DETAILED DESCRIPTION

In embodiments described below, cell handover and reselection techniques are utilized in a heterogeneous wireless network to allow a user device to reselect or be handed over to a new cell while minimizing unnecessary or inefficient handovers and reselections. In general, the disclosed example techniques account for the topology of heterogeneous wireless networks as opposed to prior generation homogeneous wireless networks. In some embodiments, the network (e.g., a network controller in a cell) considers the cell size of a target cell and a mobility state of the involved user device. In other embodiments, the user device directly considers the cell size of the target cell and the mobility state of the user device when deciding to reselect a new cell. At least in some embodiments and/or situations, techniques described herein permit better resource utilization for heterogeneous networks. For example, small cells can be used to boost capacity for stationary users, whereas macro cells can be used for high-mobility users. In at least some embodiments and/or scenarios, air resource waste is reduced, control signals related to handover and/or cell reselection for high-mobility users is reduced, and/or cost-efficiency and/or power-efficiency is improved by recognizing the lack of a need for detection and/or measurement of small cells for high-mobility users.

Figure 1:
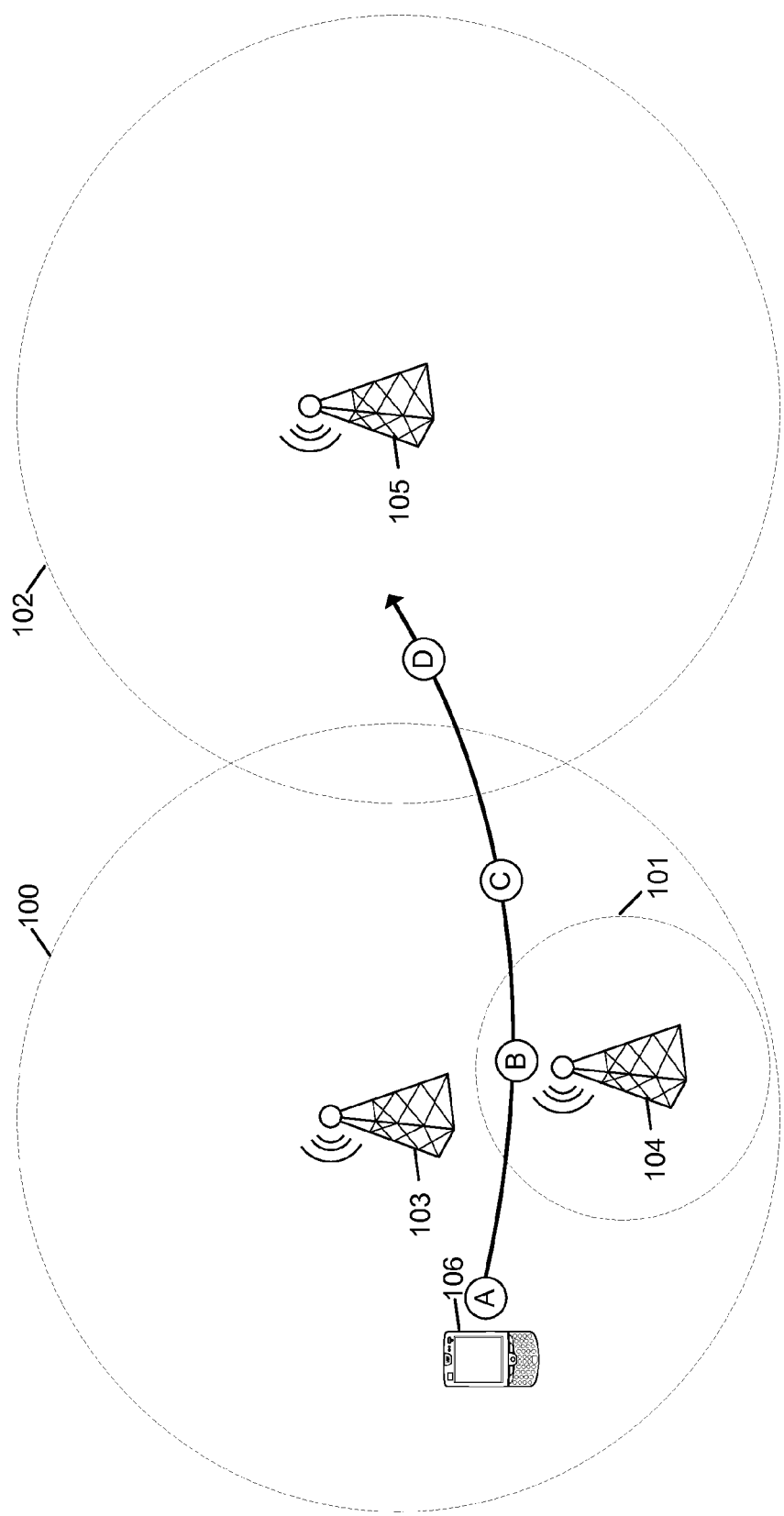
FIG. 1 is a diagram of an example heterogeneous cellular network in which cell reselection and handover techniques are implemented, according to an embodiment.

FIG. 1 is a block diagram of an example heterogeneous cellular network in which cell reselection and handover techniques are implemented, according to an embodiment. The cellular network includes (i) a first macro cell 100 served by a first base station, (ii) a small cell 101 served by a second base station 104, and (iii) a second macro cell 102 served by a third base station 105.

In some scenarios, a user device 106 (e.g., a mobile telephone, in an embodiment) moves within the geographic area of the cellular network. A path including locations "A" through "D" depicts a route that, in one example scenario, the user device 106 follows over time.

If the user device 106 were in idle mode, the user device 106 would be registered with base station 103 at point "A." As the user device 106 moves to point "B," the user device 106 may reselect base station 104. As the user device 106 moves to point "C," the user device 106 would then reselect base station 103. If the user device 106 is travelling at a relatively high rate of speed, the reselection from base station 103 to base station 104, and then back to base station 103 would happen in quick succession. Example techniques disclosed herein seek to eliminate or minimize this type of unnecessary reselection. For instance, according to an example technique disclosed herein, if the user device 106 is characterized as a high-mobility user (e.g., a speed of a the device 106 is above a threshold) then, as a result, no cell reselection would take place at point "B," and therefore no reselection would be necessary at point "C." Rather, the user device 106 would remain registered to base station 103 from point A through point C. On the other hand, if the user device 106 were not characterized as a high-mobility user (e.g., the speed of the device 106 is below the threshold), then, as a result, the user device 160 would be allowed to perform the reselection at point "B". In either case (e.g., whether or not the user device 106 is characterized as a high-mobility device), the user device 106 would perform cell reselection as it moved from point "C" to "D," from the macro cell 100 to the macro cell 102.

Similarly, if the user device 106 were in an active communication mode, the user device 106 would be connected to base station 103 at point "A." As the user device 106 moves to point "B," the user device 106 may be handed over to base station 104. As the user device 106 moves to point "C," the user device 106 may then be handed back over to base station 103. If the user device 106 is travelling at a relatively high rate of speed, the handover from base station 103 to base station 104, and then back to base station 103 would happen in quick succession. Example techniques disclosed herein seek to eliminate or minimize this type of unnecessary handover. For instance, according to an example technique disclosed herein, if the user device 106 is characterized as a high-mobility user, no handover would take place at point "B," and therefore no handover would be necessary at point "C." On the other hand, if the user device 106 were not characterized as a high-mobility user, handovers as points "A" and "B" are permitted. In either case (e.g., whether or not the user device 106 is characterized as a high-mobility device), the user device 106 would be handed over from base station 103 to base station 105 as the user device 106 moves from point "C" to "D," from the macro cell 100 to the macro cell 102.

In an embodiment, the cellular network of FIG. 1 is a 3GPP LTE network (i.e., conforms to a version of the 3GPP LTE Specification). In this embodiment, and using 3GPP LTE terminology, each of the base stations 103, 104, and 105 is referred to as an "evolved Node B" or "E-UTRAN Node B" (eNB), and user device 106 is referred to as "user equipment" (UE). In other embodiments, the cellular network is a different suitable type of network, or a combination of multiple networks. For example, in another embodiment, the cellular network of FIG. 1 is a WiMAX network, a 3$^{rd}$ Generation Partnership Project Universal Mobile Telecommunications System (3GPP UMTS) network, a hybrid UMTS/LTE network, etc., according to various embodiments.

Figure 2:
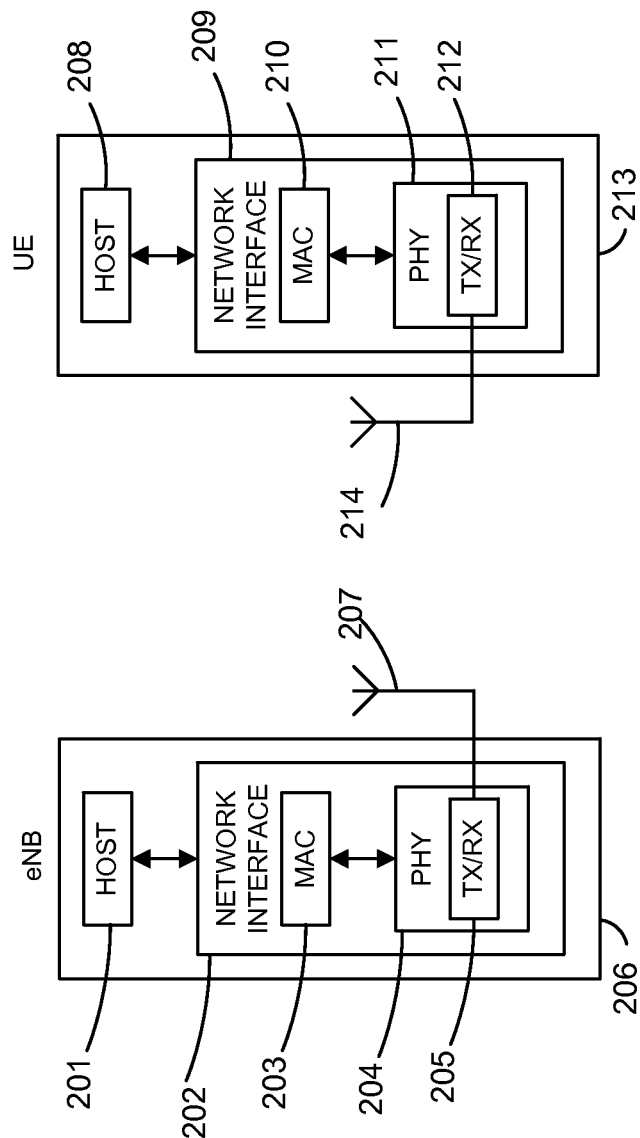
FIG. 2 is a block diagram of communication devices that are utilized in a heterogeneous cellular network such as the example network of FIG. 1, according to an embodiment.

FIG. 2 is a block diagram of example communication devices that are used in a heterogeneous cellular network in which cell reselection and handover techniques are implemented, according to an embodiment. For ease of explanation, the communication devices of FIG. 2 are referred to using 3GPP LTE terminology (e.g., eNB and UE). Other embodiments, however, include other suitable types of communication devices, such as WiMAX communication devices, etc.

An eNB 206 includes a host processor 201 coupled to a network interface 202. The host processor 201 comprises a processor that executes machine readable instructions, in an embodiment. The network interface 202 includes a medium access control (MAC) processing unit 203 and a physical layer (PHY) processing unit 204. The PHY processing unit 204 includes a transceiver 205 coupled to an antenna 207. Although one transceiver 205 and one antenna 207 are illustrated in FIG. 2, the eNB 206 includes a different suitable number (e.g., 2, 3, 4, 5, etc.) of transceivers 205 and antennas 207 in other embodiments. In various embodiments, one, some, or all of the eNBs in the network have a structure the same as or similar to the eNB 206. For example, the eNB 103 has a structure the same as or similar to the eNB 206, and the eNB 104 has a structure the same as or similar to the eNB 206, in an embodiment. As another example, the eNB 105 has a structure the same as or similar to the eNB 206, in an embodiment.

A UE 213 is configured to communicate with any one of eNBs 206 (depending on which cell is selected, reselected, or the recipient of a cell handover), and includes a host processor 208 coupled to a network interface 209. The host processor 208 comprises a processor that executes machine readable instructions, in an embodiment. The network interface 209 includes a MAC processing unit 210 and a PHY processing unit 211. The PHY processing unit 211 includes a transceiver 212, and the transceiver 212 is coupled to an antenna 214. Although one transceiver 212 and one antenna 214 are illustrated in FIG. 2, the UE 213 includes a different suitable number (e.g., 2, 3, 4, 5, etc.) of transceivers 212 and antennas 214 in other embodiments. In an embodiment, UE 213 is configured to selectively operate in either an idle mode or an active communication mode. In some embodiments, UE 213 is further configured to selectively operate in one or more additional modes. In an embodiment, the UE 106 has a structure the same as or similar to the UE 213, in an embodiment.

Figure 3:
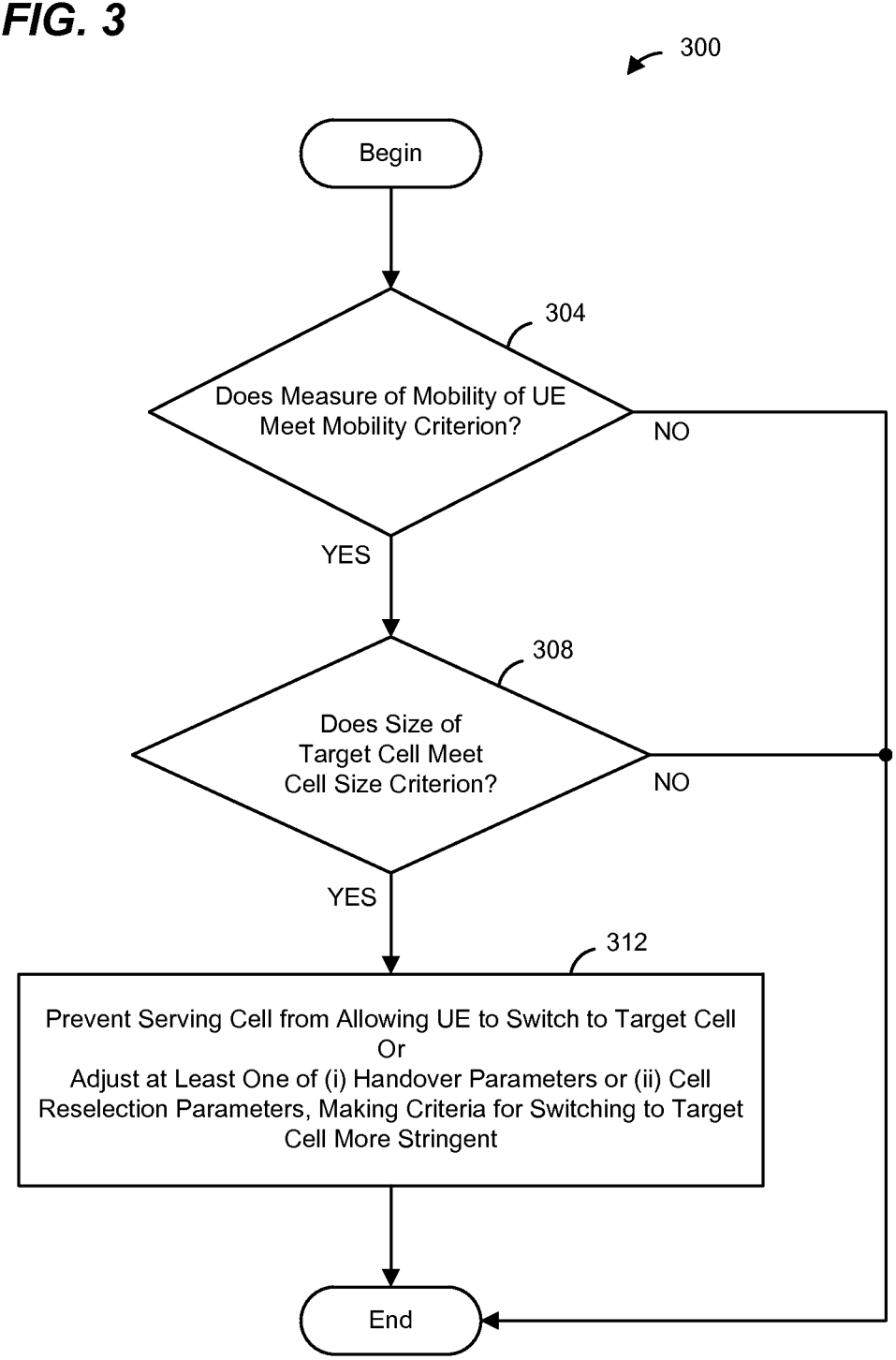
FIG. 3 is a flow diagram of an example method for determining whether (i) to permit a user device to switch cells or (ii) to make criteria for switching cells more stringent, according to an embodiment.

FIG. 3 is a flow diagram of an example method 300 for determining whether to allow a UE to switch to a target cell, or whether to make requirements for switching to the target cell more stringent, according to an embodiment. In an embodiment, the method 300 is implemented by a serving cell, e.g., the eNB 103, and the method 300 is discussed in the context of the eNB 103 for illustrative purposes. In other embodiments, however, the method 300 is implemented by another suitable device, such as a network controller device. In an embodiment, the method 300 is implemented by the eNB 206. For example, in an embodiment, the method 300 is implemented at least partially by the host 201. As another example, in an embodiment, the method 300 is implemented at least partially by the network interface device 202. In an embodiment, the method 300 is implemented partially by the host 201 and partially by the network interface device 202.

At block 304, it is determined whether a measure of mobility of a UE meets a mobility criterion. For example, in an embodiment, it is determined whether a speed of the UE meets (e.g., is greater than, or is greater than or equal to) a threshold. In an embodiment, the eNB 103 measures the speed of the UE using a suitable technique. For example, the eNB 103 estimates the speed of the UE based on proximity or position data collected by the eNB 103, e.g., in connected and/or idle modes. In another embodiment, the UE measures its own speed and reports its speed to the eNB 103. The UE estimates its speed in a suitable manner. For example, in an embodiment, the UE includes a positioning system (e.g., a Global Positioning System (GPS) or another suitable positioning system), and estimates its speed using positioning data. In other embodiments, the UE estimates its speed based on a frequency of handovers or cell reselections, or from physical layer measurements and calculations associated with a serving cell or a target cell. The physical layer measurements and calculations include, but are not limited to, channel estimation, channel quality information measurement and report, signal power and quality measurement and report, and so on.

In some embodiments, the measure of mobility of the UE is a relative speed of the UE with respect to the target cell 101. For example, in some scenarios, the target cell 101 is moving (e.g., the target eNB 104 is on a moving object such as a train, a boat, etc.), and the relative speed of the UE with respect to the moving target cell 101 is considered. In an embodiment, the eNB determines the relative speed of the UE with respect to the target cell 101 using a suitable technique. For example, the eNB 103 estimates the speed of the UE and/or estimates the speed of the target cell 101 based on proximity or position data collected by the eNB 103, e.g., in connected and/or idle modes, in some embodiments. In other embodiments, the eNB 103 receives reports of the speed of the UE from the UE and/or receives reports of the speed of the target cell 101 from the target eNB 104. In an embodiment, the UE determines the relative speed of the UE with respect to the target cell 101, and the eNB 103 receives a report of the relative speed from the UE. In an embodiment, determining the relative speed includes considering a direction of movement of the UE and a direction of movement of the target eNB 104.

In an embodiment, the mobility criterion varies depending on a size of the target cell 101, and the eNB 103 determines the mobility criterion using the size of the size of the target cell. For example, in an embodiment, a speed threshold generally varies with respect to the size of the target cell 101 (e.g., the speed threshold generally increases as the size of the target cell 101 increases).

When the measure of mobility meets the mobility criterion, the UE is considered in a high mobility state (e.g., the UE is moving quickly, and/or the UE is moving relatively quickly with respect to the target cell 101), in an embodiment. On the other hand, when the measure of mobility does not meet the mobility criterion, the UE is considered not in the high mobility state (e.g., the UE is stationary, is moving slowly, is moving relatively slowly with respect to the target cell 101, etc.), in an embodiment.

When it is determined that the measure of mobility of the UE does not meet the mobility criterion, the flow ends. On the other hand, when it is determined that the measure of mobility of the UE meets the mobility criterion, the flow proceeds to block 308. At block 308, it is determined whether a size of the target cell 101 meets a cell size criterion. For example, in an embodiment, it is determined whether the size of the target cell 101 meets (e.g., is less than, or is less than or equal to) a threshold. In an embodiment, the eNB 103 determines the size of the target cell 101 using a suitable technique. For example, the UE estimates the size of the target cell 101 by measuring a transmit power of the target cell 101, and then the UE reports the cell size of the target cell 101 to the eNB 103, in an embodiment. In another embodiment, the size of target cell 101 was reported previously from one or more than one UEs to the eNB 103, and the eNB 103 stores and determines the size of the cell 101 based on the reports, collectively. In another embodiment, the eNB 103 estimates the size of the target cell 101 by measuring the transmit power of the target cell 101. In another embodiment, the target eNB 104 reports the size of the target cell 101 to the eNB 103. In an embodiment, determining whether the size of the target cell 101 meets the cell size criterion comprises determining whether a transmit power corresponding to the target cell 101 meets (e.g., is less than, or is less than or equal to) a power threshold.

When the size of the target cell 101 meets the cell size criterion, the target cell 101 is considered a small cell (e.g., the target cell 101 is a pico cell, a femto cell, a micro cell, etc.), in an embodiment. On the other hand, when size of the target cell 101 does not meet the cell size criterion, the target cell 101 is not considered a small cell (e.g., the target cell 101 is a macro cell), in an embodiment.

When it is determined that the size of the target cell 101 does not meet the cell size criterion, the flow ends. On the other hand, when it is determined that the size of the target cell 101 meets the cell size criterion, the flow proceeds to block 312. The order shown, wherein block 304 is before block 308, here is merely an example. In another embodiment, the block 308 is before block 304. In another embodiment, block 304 and block 308 are processed in parallel, and the flow proceeds to block 312 when both the conditions of both blocks are met.

At block 312, the serving eNB 103 is prevented from permitting the UE to switch to the target cell 101, in some embodiments. For example, the serving eNB 103 is prevented from issuing a handover command in connection with a switch of the UE to the target cell 101, in an embodiment. As another example, the serving eNB 103 is prevented from configuring the UE to make a handover measurement of the target cell 101 in connection with a switch of the UE to the target cell 101, in an embodiment. As another example, the serving eNB 103 is prevented from configuring the UE to make a cell reselection measurement of the target cell 101 in connection with a switch of the UE to the target cell 101, in an embodiment.

In other embodiments, the eNB 103 adjusts handover parameters to make criteria for switching to the target cell 101 more stringent (e.g., decreasing a probability that the eNB 103 will allow the UE to switch from the serving cell 100 to the target cell 101). In other embodiments, the eNB 103 adjusts cell reselection parameters to make criteria for switching to the target cell 101 more stringent (e.g., decreasing a probability that the eNB 103 will allow the UE to switch from the serving cell 100 to the target cell 101). In other embodiments, the eNB 103 adjusts both (i) handover parameters, and (ii) cell reselection parameters to make criteria for switching to the target cell 101 more stringent (e.g., decreasing a probability that the eNB 103 will allow the UE to switch from the serving cell 100 to the target cell 101).

For example, the serving eNB 103 adjusts a signal strength threshold to which a measure of signal strength (from a standpoint of the UE) corresponding to the target cell 101 is compared when determining whether to permit the UE to switch to the target cell 101, in an embodiment. For example, the measure of signal strength (from a standpoint of the UE) corresponding to the target cell 101 meeting the signal strength threshold (e.g., (i) exceeding the signal strength threshold, or (ii) reaching or exceeding the signal strength threshold) is a necessary criterion for permitting the UE to switch to the target cell 101, in an embodiment, and increasing the signal strength threshold thus makes the criterion more stringent. In an embodiment, the measure of signal strength (from a standpoint of the UE) is a reference signal received power (RSRP) that measures a power of a signal of the target eNB 104 received at the UE 106. In another embodiment, the measure of signal strength (from a standpoint of the UE) corresponding to the target cell 101 is a received signal strength indicator (RSSI). In another embodiment, the measure of signal strength (from a standpoint of the UE) corresponding to the target cell 101 is a channel quality indicator (CQI). In another embodiment, the measure of signal strength (from a standpoint of the UE) corresponding to the target cell 101 is a handover hysteresis value, which is a comparison of a signal strength of the target cell with a signal strength of the serving cell.

In an embodiment, the measure of signal strength (from a standpoint of the UE) is a comparison of (a) a signal strength of the serving cell 100 with (b) a signal strength of the target cell 101. For example, in an embodiment, the measure of signal strength (from a standpoint of the UE) is a reference signal received quality (RSRQ), which is a ratio of (a) an RSRP with (b) a cumulative received power at the UE.

As another example, the serving eNB 103 adjusts a time threshold to which a time duration is compared, the time duration corresponding to a time period in which a handover condition is satisfied when determining whether to permit the UE to switch to the target cell 101, in an embodiment. For example, the time duration meeting the time threshold (e.g., (i) exceeding the time threshold, or (ii) reaching or exceeding the time threshold) is a necessary criterion for permitting the UE to switch to the target cell 101, in an embodiment, and increasing the time threshold thus makes the criterion more stringent. The time duration corresponds to a time period in which a signal strength measurement corresponding to the target cell 101 meets a handover condition, e.g., the signal strength measurement meets a signal strength threshold, in an embodiment.

In an embodiment, the time threshold is a time to trigger (TTT) parameter, and the serving eNB 103 increases the TTT parameter. In another embodiment, the time threshold is a T_reselectionRAT parameter, and the serving eNB 103 increases the T_reselectionRAT parameter. In other embodiments, other suitable handover and/or cell reselection parameters are adjusted to make requirements for handover or cell reselection more stringent.

Figure 4:
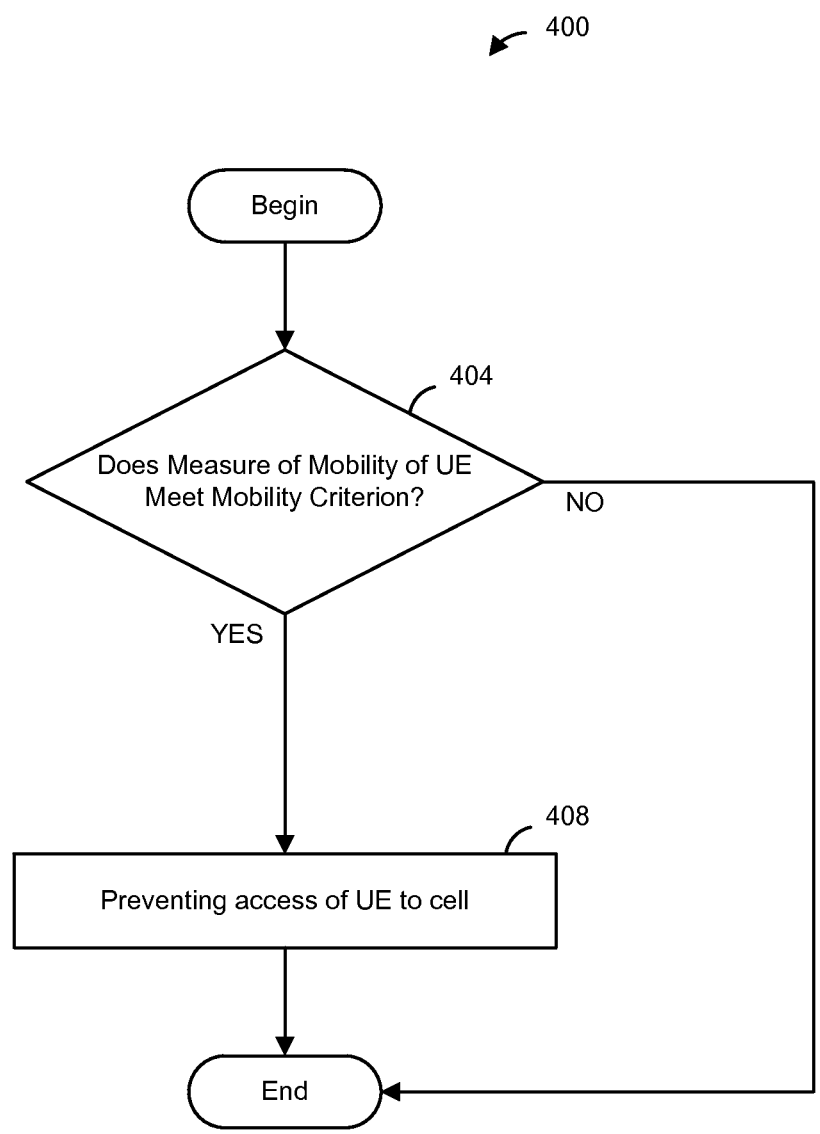
FIG. 4 is a flow diagram of an example method for determining whether to prevent a user device from connecting to a cell, according to an embodiment.

FIG. 4 is a flow diagram of an example method 400 for determining whether to allow a UE to switch to a target cell, according to an embodiment. In an embodiment, the method 400 is implemented by a target cell, e.g., the eNB 104, and the method 400 is discussed in the context of the eNB 104 for illustrative purposes. In other embodiments, however, the method 400 is implemented by another suitable device, such as a network controller device. In an embodiment, the method 400 is implemented by the eNB 206. For example, in an embodiment, the method 400 is implemented at least partially by the host 201. As another example, in an embodiment, the method 400 is implemented at least partially by the network interface device 202. In an embodiment, the method 400 is implemented partially by the host 201 and partially by the network interface device 202.

At block 404, it is determined whether a measure of mobility of a UE meets a mobility criterion. For example, in an embodiment, it is determined whether a speed of the UE meets (e.g., is greater than, or is greater than or equal to) a threshold. In an embodiment, the eNB 104 measures the speed of the UE using a suitable technique such as discussed above with respect to FIG. 3. In another embodiment, the UE measures its own speed and reports its speed to the eNB 104. In some embodiments, the measure of mobility of the UE is a relative speed of the UE with respect to the target cell 101. In an embodiment, the mobility criterion varies depending on a size of the target cell 101, and the mobility criterion is determined using the size of the target cell.

When it is determined that the measure of mobility of the UE does not meet the mobility criterion, the flow ends. On the other hand, when it is determined that the measure of mobility of the UE meets the mobility criterion, the flow proceeds to block 408. At block 408, the eNB 104 prevents access to the cell 101 by the UE 106. For example, in an embodiment, the eNB 104 does not accept a handover of the UE 106. As another example, in an embodiment, the eNB 104 does not permit a cell reselection of the UE 106 to the cell 101.

Figure 5:
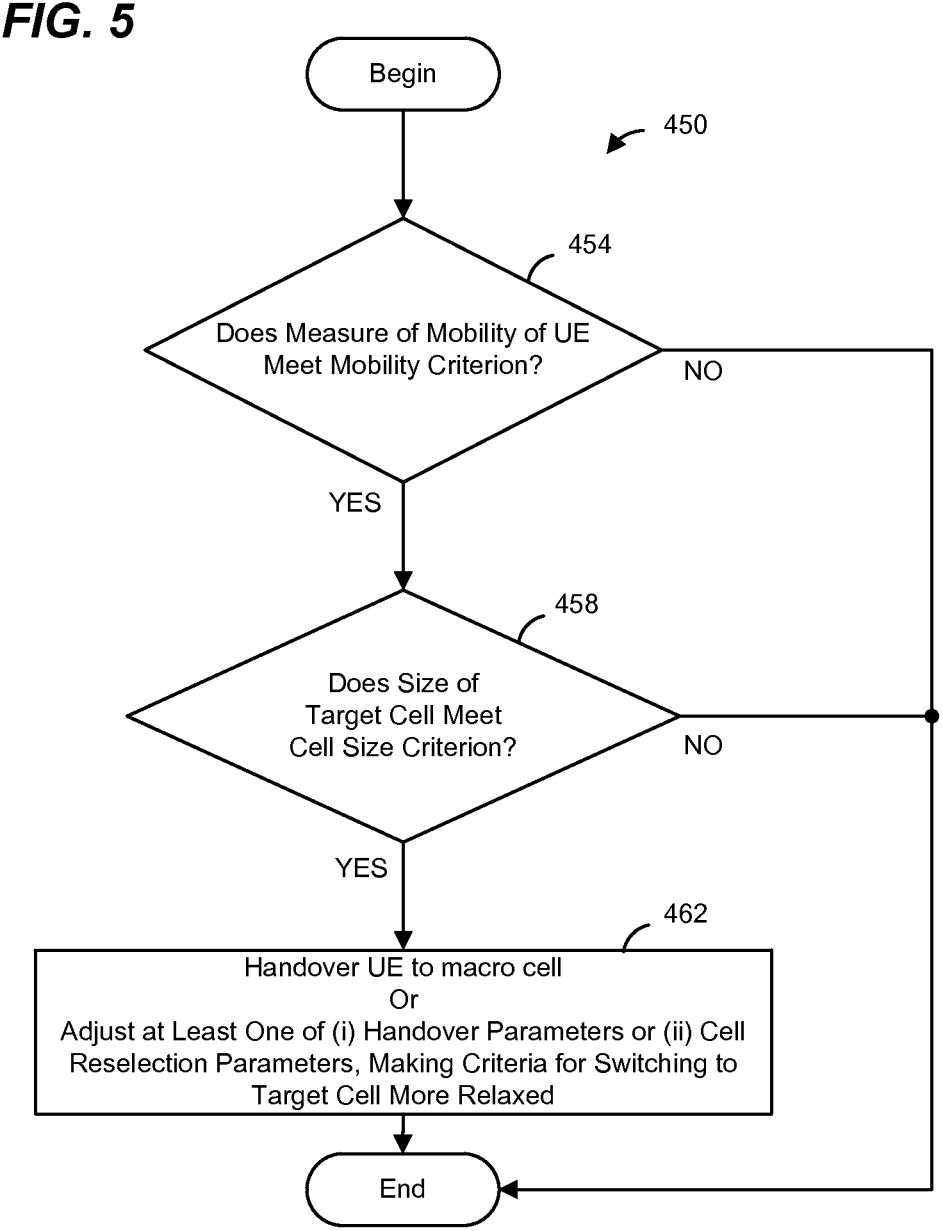
FIG. 5 is a flow diagram of an example method for determining whether to handover a user device to a cell, according to an embodiment.

FIG. 5 is a flow diagram of an example method 450 for determining whether to handover a UE to a target cell, according to an embodiment. In an embodiment, the method 450 is implemented by a small cell, e.g., the eNB 104, and the method 450 is discussed in the context of the eNB 104 for illustrative purposes. In other embodiments, however, the method 450 is implemented by another suitable device, such as a network controller device. In an embodiment, the method 450 is implemented by the eNB 206. For example, in an embodiment, the method 450 is implemented at least partially by the host 201. As another example, in an embodiment, the method 450 is implemented at least partially by the network interface device 202. In an embodiment, the method 450 is implemented partially by the host 201 and partially by the network interface device 202.

The method 450 is implemented when the UE 106 is connected to the small cell 101, in an embodiment. The method 450 relates to determining whether the UE 106 should be handed over from the small cell 101 to the target cell 100, in an embodiment.

At block 454, it is determined whether a measure of mobility of the UE meets a mobility criterion. For example, in an embodiment, it is determined whether a speed of the UE meets (e.g., is greater than, or is greater than or equal to) a threshold. In an embodiment, the eNB 104 measures the speed of the UE using a suitable technique such as discussed above with respect to FIG. 3. In another embodiment, the UE measures its own speed and reports its speed to the eNB 104. In some embodiments, the measure of mobility of the UE is a relative speed of the UE with respect to the small cell 101. In an embodiment, the mobility criterion varies depending on a size of the small cell 101, and the mobility criterion is determined using the size of the size of the small cell 101.

When it is determined that the measure of mobility of the UE does not meet the mobility criterion, the flow ends. On the other hand, when it is determined that the measure of mobility of the UE meets the mobility criterion, the flow proceeds to block 458. At block 458, it is determined whether a size of the target cell 100 meets a cell size criterion. For example, in an embodiment, it is determined whether the size of the target cell 100 meets (e.g., is greater than, or is greater than or equal to) a threshold. In an embodiment, the eNB 104 determines the size of the target cell 100 using a suitable technique such as described above with respect to FIG. 3.

When the size of the target cell 100 meets the cell size criterion, the target cell 100 is considered a macro cell, in an embodiment. On the other hand, when size of the target cell 100 does not meet the cell size criterion, the target cell 100 is not considered a macro cell, in an embodiment.

When it is determined that the size of the target cell 100 does not meet the cell size criterion, the flow ends. On the other hand, when it is determined that the size of the target cell 101 meets the cell size criterion, the flow proceeds to block 462. The order of block 454 and 458 can be interchanged, or the blocks can be implemented in parallel, as discussed for FIG. 3.

At block 462, the eNB 104 issues a handover command corresponding to the UE 106 switching to the cell 100. In some embodiments, the method 450 is performed soon after the UE 106 connects with the small cell 101 (e.g., in response to the UE 106 connecting with the small cell 101).

In other embodiments, the eNB 104 adjust handover parameters to make criteria for switching to the target cell 101 more relaxed (e.g., increasing a probability that the eNB 104 will allow the UE to switch from the serving cell 101 to the target cell 100). In other embodiments, the eNB 104 adjusts cell reselection parameters to make criteria for switching to the target cell 101 more relaxed (e.g., increasing a probability that the eNB 104 will allow the UE to switch from the serving cell 101 to the target cell 100). In other embodiments, the eNB 104 adjusts both (i) handover parameters, and (ii) cell reselection parameters to make criteria for switching to the target cell 100 more relaxed (e.g., increasing a probability that the eNB 104 will allow the UE to switch from the serving cell 101 to the target cell 100).

In an embodiment, the measure of signal strength (from a standpoint of the UE) is a comparison of (a) a signal strength of the serving cell 101 with (b) a signal strength of the target cell 100. In another embodiment, the UE measures and compares the signal strength of eNBs using a suitable technique such as discussed above with respect to FIG. 3

As another example, the serving eNB 104 adjusts a time threshold to which a time duration is compared, the time duration corresponding to a time period in which a handover condition is satisfied when determining whether to permit the UE to switch to the target cell 100, in an embodiment. For example, the time duration meeting the time threshold (e.g., (i) exceeding the time threshold, or (ii) reaching or exceeding the time threshold) is a necessary criterion for permitting the UE to switch to the target cell 100, in an embodiment, and decreasing the time threshold thus makes the criterion more relaxed. The time duration corresponds to a time period in which a signal strength measurement corresponding to the target cell 100 meets a handover condition, e.g., the signal strength measurement meets a signal strength threshold, in an embodiment.

In an embodiment, the time threshold is a time to trigger (TTT) parameter, and the serving eNB 104 decreases the TTT parameter. In another embodiment, the time threshold is a T_reselectionRAT parameter, and the serving eNB 104 decreases the T_reselectionRAT parameter. In other embodiments, other suitable handover and/or cell reselection parameters are adjusted to make requirements for handover or cell reselection more relaxed.

Figure 6:
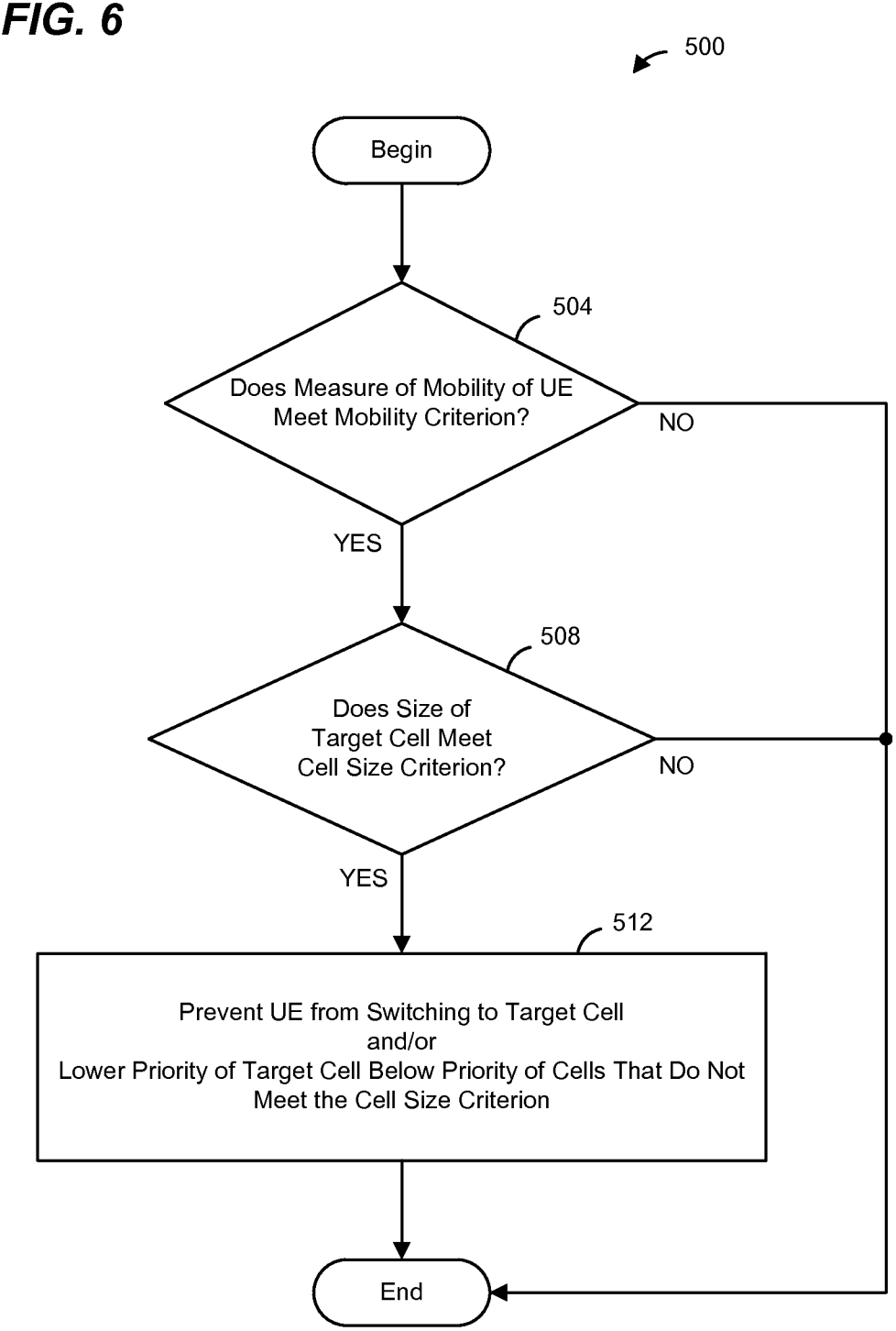
FIG. 6 is a flow diagram of an example method for determining whether (i) to prevent a user device from switching to a cell or (ii) to lower a priority of a cell, according to an embodiment.

FIG. 6 is a flow diagram of an example method 500 for determining whether to allow a UE to switch to a target cell, or whether to reprioritize a cell for cell reselection, according to an embodiment. In an embodiment, the method 500 is implemented by a user device, e.g., the UE 106, and the method 500 is discussed in the context of the UE 106 for illustrative purposes. In other embodiments, however, the method 500 is implemented by another suitable device. In an embodiment, the method 500 is implemented by the UE 213. For example, in an embodiment, the method 500 is implemented at least partially by the host 208. As another example, in an embodiment, the method 500 is implemented at least partially by the network interface device 209. In an embodiment, the method 500 is implemented partially by the host 208 and partially by the network interface device 209.

At block 504, it is determined whether a measure of mobility of the UE meets a mobility criterion. For example, in an embodiment, it is determined whether a speed of the UE meets (e.g., is greater than, or is greater than or equal to) a threshold. In an embodiment, the UE 106 measures its own speed using techniques such as described above with respect to FIG. 3. In another embodiment, an eNB measures the speed of the UE 106 using a suitable technique such as discussed above with respect to FIG. 3, and reports the speed to the UE 106. In some embodiments, the measure of mobility of the UE is a relative speed of the UE with respect to a target cell 101. In an embodiment, the mobility criterion varies depending on a size of the target cell 101, and the mobility criterion is determined using the size of the size of the target cell 101.

When it is determined that the measure of mobility of the UE does not meet the mobility criterion, the flow ends. On the other hand, when it is determined that the measure of mobility of the UE meets the mobility criterion, the flow proceeds to block 508. At block 508, it is determined whether a size of the target cell 100 meets a cell size criterion. For example, in an embodiment, it is determined whether the size of the target cell 100 meets (e.g., is less than, or is less than or equal to) a threshold. In an embodiment, the UE 106 determines the size of the target cell 101 using a suitable technique such as described above with respect to FIG. 3.

When the size of the target cell 101 meets the cell size criterion, the target cell 101 is considered a small cell, in an embodiment. On the other hand, when size of the target cell 101 does not meet the cell size criterion, the target cell 101 is not considered a small cell, in an embodiment.

When it is determined that the size of the target cell 101 does not meet the cell size criterion, the flow ends. On the other hand, when it is determined that the size of the target cell 101 meets the cell size criterion, the flow proceeds to block 512. The order of block 504 and 508 can be interchanged, or the blocks can be implemented in parallel, as discussed for FIG. 3.

At block 512, the UE 106 is prevented from switching to the cell 101, in an embodiment. For example, the UE 106 is prevented from considering the cell 101 as part of a cell reselection procedure, in an embodiment. As another example, the UE 106 is prevented from performing detection procedures associated with detecting the cell 101 as part of a cell reselection procedure or handover-related procedure, in an embodiment. As another example, the UE 106 is prevented from performing measurements corresponding to the cell 101 as part of a cell reselection procedure or handover-related procedure, in an embodiment.

Additionally or alternatively, the priority corresponding to the cell 101 is lowered to be below a priority corresponding to cells that do not meet the cell size criterion corresponding to block 508. For example, in an embodiment, the priority corresponding to the cell 101 is lowered to be below a priority corresponding to macro cells. In an embodiment, the priority corresponding to the cell 101 is lowered to a value such that the cell 101 will not be given any consideration associated with a cell reselection procedure.

Figure 7:
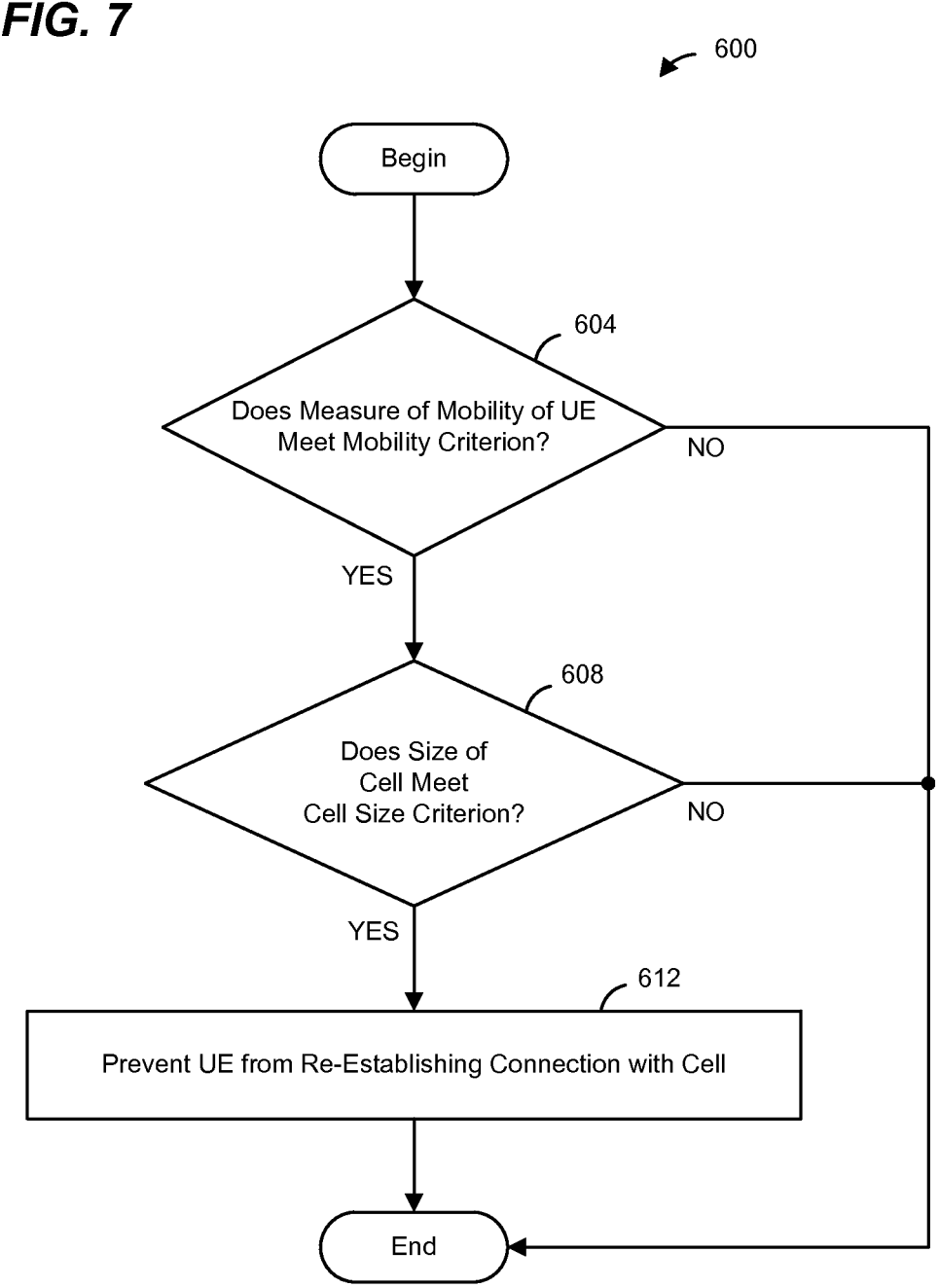
FIG. 7 is a flow diagram of an example method for determining whether to prevent a user device from re-establishing a connection to a cell, according to an embodiment.

FIG. 7 is a flow diagram of an example method 600 for determining whether to allow a UE to reconnect to a cell (e.g., attempt connection re-establishment) after a connection failure such as a connection setup failure, a handover failure, or a radio link failure, according to an embodiment. In an embodiment, the method 600 is implemented by a user device, e.g., the UE 106, and the method 600 is discussed in the context of the UE 106 for illustrative purposes. In other embodiments, however, the method 600 is implemented by another suitable device. In an embodiment, the method 600 is implemented by the UE 213. For example, in an embodiment, the method 600 is implemented at least partially by the host 208. As another example, in an embodiment, the method 600 is implemented at least partially by the network interface device 209. In an embodiment, the method 600 is implemented partially by the host 208 and partially by the network interface device 209.

As discussed above, the method 600 is implemented when the UE 106 was connected to a cell (e.g., the small cell 101) but suffered a connection failure, in an embodiment. The method 600 relates to determining whether the UE 106 should re-establish a connection with the cell to which it was previously connected, in an embodiment.

At block 604, it is determined whether a measure of mobility of the UE meets a mobility criterion. For example, in an embodiment, it is determined whether a speed of the UE meets (e.g., is greater than, or is greater than or equal to) a threshold. In an embodiment, the UE 106 measures its own speed using techniques such as described above with respect to FIG. 3. In another embodiment, an eNB measures the speed of the UE 106 using a suitable technique such as discussed above with respect to FIG. 3, and reports the speed to the UE 106. In some embodiments, the measure of mobility of the UE is a relative speed of the UE with respect to the cell to which the UE was previously connected. In an embodiment, the mobility criterion varies depending on a size of the cell to which the device was previously connected, and the mobility criterion is determined using the size of the size of the cell.

When it is determined that the measure of mobility of the UE does not meet the mobility criterion, the flow ends. On the other hand, when it is determined that the measure of mobility of the UE meets the mobility criterion, the flow proceeds to block 608. At block 608, it is determined whether a size of the target cell 100 meets a cell size criterion. For example, in an embodiment, it is determined whether the size of the target cell 100 meets (e.g., is less than, or is less than or equal to) a threshold. In an embodiment, the UE 106 determines the size of the target cell 101 using a suitable technique such as described above with respect to FIG. 3.

When the size of the target cell meets the cell size criterion, the target cell is considered a small cell, in an embodiment. On the other hand, when size of the target cell does not meet the cell size criterion, the target cell is not considered a small cell, in an embodiment.

When it is determined that the size of the target cell does not meet the cell size criterion, the flow ends. On the other hand, when it is determined that the size of the target cell meets the cell size criterion, the flow proceeds to block 612. The order of block 604 and 608 can be interchanged, or the blocks can be implemented in parallel, as discussed for FIG. 3.

At block 612, the UE 106 is prevented from attempting to re-establish a connection to the cell 101, in an embodiment.

The methods discussed above with respect to FIGS. 3-7 may be modified in various ways. For example, additional method blocks may be added, method blocks may be modified or omitted, and the ordering of blocks may be modified. For example, in FIG. 3, the order of blocks 304 and 308 may be reversed, and in FIG. 5, the order of blocks 454 and 458 may be reversed. Similarly, in FIG. 6, the order of blocks 504 and 508 may be reversed, and in FIG. 7, the order of blocks 604 and 608 may be reversed. Other modifications are contemplated.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the embodiments were discussed in the context of 3GPP LTE merely for illustrative purposes, in other embodiments, the techniques discussed above are utilized in other types of systems such as cellular (WiMAX, UMTS WCDMA, and CDMA2000) and wireless LANs (WiFi) systems. Additionally, aspects of the embodiments discussed above may be implemented in homogeneous wireless networks.

Further aspects of the present invention relate to one or more of the following clauses.

In an embodiment, a method of controlling a switching of a user device from a first cell to a second cell in a wireless network includes: determining whether a measure of mobility of the user device meets a mobility criterion; determining whether a size of the second cell meets a cell size criterion; and when it is determined that (i) the measure of mobility of the user device meets the mobility criterion and (ii) the size of the second cell meets the cell size criterion, preventing the user device from being switched from the first cell to the second cell, or adjusting at least one of (i) a handover parameter or (ii) a cell reselection parameter in order to change a probability that the user device will switch from the first cell to the second cell.

In other embodiments, the method includes any combination of one or more of the following clauses.

The method further comprises preventing the first cell from issuing a handover command to the user device when it is determined that (i) the measure of mobility of the user device meets the mobility criterion and (ii) the size of the second cell meets the cell size criterion.

The method further comprises, when it is determined that (i) the measure of mobility of the user device meets the mobility criterion and (ii) the size of the second cell meets the cell size criterion, preventing the first cell from allowing the user device to switch from the first cell to the second cell by preventing the first cell from at least one of (i) allowing the user device to perform a handover measurement corresponding to the second cell, or (ii) allowing the user device to perform a cell reselection measurement corresponding to the second cell.

The method further comprises, when it is determined that (i) the measure of mobility of the user device meets the mobility criterion and (ii) the size of the second cell meets the cell size criterion, preventing the user device from allowing the user device to switch from the first cell to the second cell by preventing the user device from at least one of (i) considering the second cell as part of a cell reselection procedure, (ii) performing detection procedures associated with detecting the second cell as part of a cell reselection procedure or handover-related procedure, or (iii) performing measurements corresponding to the second cell as part of a cell reselection procedure or handover-related procedure.

The method further comprises, when it is determined that (i) the measure of mobility of the user device meets the mobility criterion and (ii) the size of the second cell meets the cell size criterion, adjusting at least one of (i) the handover parameter or (ii) the cell reselection parameter in order to change the probability that the first cell will allow the user device to switch from the first cell to the second cell by at least one of (a) changing a first threshold to which a measure of signal strength corresponding to the second cell is compared, or (b) changing a second threshold to which a time duration is compared, the time duration corresponding to a time period in which a handover condition is satisfied.

The method further comprises changing the first threshold to which the measure of signal strength corresponding to the second cell is compared at least by changing a threshold corresponding to a signal strength of the second cell.

The method further comprises changing the first threshold to which the measure of signal strength corresponding to the second cell is compared at least by changing a threshold corresponding to a comparison of (a) a signal strength of the second cell with (b) a cumulative received power at the user device.

The method further comprises, when it is determined that (i) the measure of mobility of the user device meets the mobility criterion and (ii) the size of the second cell meets the cell size criterion, lowering a priority associated with the second cell to a level below a level associated with the first cell.

Determining whether the measure of mobility of the user device meets the mobility criterion includes determining whether a speed of the user device meets a threshold speed.

The threshold speed varies depending on the size of the second cell.

The speed of the user device is a relative speed between the user device and the second cell.

Determining whether the size of the second cell meets a cell size criterion includes determining whether a transmit power of the second cell meets a transmit power criterion.

The wireless network is a heterogeneous network in which the first cell has a size different than the size of the second cell.

In another embodiment, an apparatus, comprises a processor configured to: determine whether a measure of mobility of a user device meets a mobility criterion, wherein the user device is within a first cell of a wireless network, determine whether a size of a second cell meets a cell size criterion, wherein the second cell is within or adjacent to the first cell in the wireless network, and when it is determined that (i) the measure of mobility of the user device meets the mobility criterion and (ii) the size of the second cell meets the cell size criterion, prevent the first cell from allowing the user device to switch from the first cell to the second cell, or adjust at least one of (i) a handover parameter or (ii) a cell reselection parameter in order to change a probability that the first cell will allow the user device to switch from the first cell to the second cell.

In other embodiments, the apparatus includes any combination of one or more of the following clauses.

The processor is configured to: prevent at least one of (a) the first cell from issuing a handover command to the user device, (b) the second cell from accepting the handover of the user device, or (c) the second cell from accepting the reselection of the user device to the second cell when it is determined that (i) the measure of mobility of the user device meets the mobility criterion and (ii) the size of the second cell meets the cell size criterion.

The processor is configured to: when it is determined that (i) the measure of mobility of the user device meets the mobility criterion and (ii) the size of the second cell meets the cell size criterion, prevent the first cell from allowing the user device to switch from the first cell to the second cell by preventing the first cell from at least one of (a) allowing the user device to perform a handover measurement corresponding to the second cell, or (b) allowing the user device to perform a cell reselection measurement corresponding to the second cell.

The processor is included in the user device; and the processor is configured to, when it is determined that (i) the measure of mobility of the user device meets the mobility criterion and (ii) the size of the second cell meets the cell size criterion, prevent the user device from allowing the user device to switch from the first cell to the second cell by preventing the user device from at least one of (a) considering the second cell as part of a cell reselection procedure, (b) performing detection procedures associated with detecting the second cell as part of a cell reselection procedure or handover-related procedure, or (c) performing measurements corresponding to the second cell as part of a cell reselection procedure or handover-related procedure.

The processor is configured to: when it is determined that (i) the measure of mobility of the user device meets the mobility criterion and (ii) the size of the second cell meets the cell size criterion, adjust at least one of (i) the handover parameter or (ii) the cell reselection parameter in order to change the probability that the first cell will allow the user device to switch from the first cell to the second cell by at least one of (a) changing a first threshold to which a measure of signal strength corresponding to the second cell is compared, or (b) changing a second threshold to which a time duration is compared, the time duration corresponding to a time period in which a handover condition is satisfied.

The processor is configured to change the first threshold to which the measure of signal strength corresponding to the second cell is compared at least by changing a threshold corresponding to a signal strength of the second cell.

The processor is configured to change the first threshold to which the measure of signal strength corresponding to the second cell is compared at least by changing a threshold corresponding to a comparison of (a) a signal strength of the second cell with (b) a cumulative received power at the user device.

The processor is configured to: when it is determined that (i) the measure of mobility of the user device meets the mobility criterion and (ii) the size of the second cell meets the cell size criterion, lower a priority associated with the second cell to a level below a level associated with the first cell.

The apparatus further comprises a base station that includes the processor.

In another embodiment, a method of controlling a switching of a user device from a first cell to a second cell in a wireless network includes determining whether a measure of mobility of the user device meets a mobility criterion; when it is determined that the measure of mobility of the user device meets the mobility criterion, preventing the user device from connecting to the second cell.

In other embodiments, the method includes any combination of one or more of the following clauses.

Preventing the user device from connecting to the second cell comprises the second cell not accepting a handover of the user device to the second cell.

Preventing the user device from connecting to the second cell comprises the second cell not accepting a cell reselection of the second cell by the user device.

The wireless network is a heterogeneous network in which the first cell has a size different than a size of the second cell.

In another embodiment, an apparatus comprises a base station serving a cell, wherein the base station is configured to determine whether a measure of mobility of a user device meets a mobility criterion, and when it is determined that the measure of mobility of the user device meets the mobility criterion, prevent the user device from connecting to the cell.

In other embodiments, the apparatus comprises any combination of one or more of the following clauses.

The base station is configured to prevent the user device from connecting to the cell by not accepting a handover of the user device to the cell.

The base station is configured to prevent the user device from connecting to the cell by not accepting a cell reselection of the cell by the user device.

In another embodiment, a method of controlling a switching of a user device from a first cell to a second cell in a wireless network includes: determining whether a measure of mobility of the user device meets a mobility criterion; determining whether a size of the second cell meets a cell size criterion; and in response to determining that (i) the measure of mobility of the user device meets the mobility criterion and (ii) the size of the second cell meets the cell size criterion, handing over the user device to the second cell.

In other embodiments, the method includes any combination of one or more of the following clauses.

Determining whether the size of the second cell meets the cell size criterion comprises determining whether the size of the second cell is greater than a cell size threshold.

The wireless network is a heterogeneous network in which the first cell has a size different than the size of the second cell.

In another embodiment, an apparatus comprises: a base station serving a first cell, wherein the base station is configured to: determine whether a measure of mobility of a user device meets a mobility criterion, determine whether a size of a second cell meets a cell size criterion, and in response to determining that (i) the measure of mobility of the user device meets the mobility criterion and (ii) the size of the second cell meets the cell size criterion, hand over the user device to the second cell.

In other embodiments, the apparatus comprise any combination of one or more of the following clauses.

The base station is configured to determine whether the size of the second cell meets the cell size criterion by determining whether the size of the second cell is greater than a cell size threshold.

In another embodiment, a method for determining whether to attempt re-establishment of a connection with a cell includes: determining whether a measure of mobility of a user device meets a mobility criterion; determining whether a size of the cell meets a cell size criterion, wherein the user device previously suffered a connection failure with the cell; and when it is determine that (i) the measure of mobility of the user device meets the mobility criterion and (ii) the size of the cell meets the cell size criterion, preventing the user device from re-establishing the connection with the cell.

In another embodiment, an apparatus comprises a processor configured to determine whether a measure of mobility of a user device meets a mobility criterion, wherein the user device includes the processor, determine whether a size of a cell meets a cell size criterion, wherein the user device previously suffered a connection failure with the cell, and when it is determined that (i) the measure of mobility of the user device meets the mobility criterion and (ii) the size of the cell meets the cell size criterion, prevent the user device from re-establishing the connection with the cell.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method of controlling a switching of a user device from a first cell to a second cell in a wireless network, the method comprising:
   determining whether speed information corresponding to a velocity of the user device meets a threshold that was determined based on a size of the second cell;
   determining whether the size of the second cell meets a cell size criterion; and
   when it is determined that (i) the speed information meets the threshold and (ii) the size of the second cell meets the cell size criterion,
      preventing the user device from being switched from the first cell to the second cell, wherein preventing the user device from being switched from the first cell to the second cell includes preventing, at a base station serving the first cell, the user device from at least one of (i) performing a handover measurement corresponding to the second cell, or (ii) performing a cell reselection measurement corresponding to the second cell.

2. The method of claim 1, wherein preventing the user device from being switched from the first cell to the second cell further includes:
   preventing the first cell from issuing a handover command to the user device.

3. The method of claim 1, wherein preventing the user device from being switched from the first cell to the second cell further includes:
   preventing the user device from at least one of (i) considering the second cell as part of a cell reselection procedure, or (ii) performing detection procedures associated with detecting the second cell as part of a cell reselection procedure or handover-related procedure.

4. The method of claim 1, wherein preventing the user device from being switched from the first cell to the second cell further includes:
   preventing the second cell from accepting a handover of the user device, or
   preventing the second cell from accepting a reselection of the user device to the second cell.

5. An apparatus, comprising:
   a processor configured to
      determine whether speed information corresponding to a velocity of a user device meets a threshold, wherein the user device is within a first cell of a wireless network, and wherein the threshold was determined based on a size of a second cell in the wireless network,
      determine whether the size of the second cell meets a cell size criterion, wherein the second cell is within or adjacent to the first cell in the wireless network, and
      when it is determined that (i) the speed information meets the threshold and (ii) the size of the second cell meets the cell size criterion,
         prevent the user device from being switched from the first cell to the second cell by at least one of:
            preventing the user device from performing a handover measurement corresponding to the second cell, or
            preventing the user device from performing a cell reselection measurement corresponding to the second cell.

6. The apparatus of claim 5, wherein the processor is configured to prevent the user device from being switched from the first cell to the second cell at least by:
   preventing the first cell from issuing a handover command to the user device.

7. The apparatus of claim 5, wherein the processor is configured to prevent the user device from being switched from the first cell to the second cell by at least one of:
   preventing the second cell from accepting a handover of the user device, or
   preventing the second cell from accepting a reselection of the user device to the second cell.

8. The apparatus of claim 5, wherein:
   the processor is included in the user device; and
   the processor is configured to prevent the user device from being switched from the first cell to the second cell by at least one of:
      preventing the user device from considering the second cell as part of a cell reselection procedure, or
      preventing the user device from performing detection procedures associated with detecting the second cell as part of a cell reselection procedure or handover-related procedure.

9. The apparatus of claim 5, wherein the processor is included in a base station that serves the first cell.

10. The apparatus of claim 5, wherein the processor is included in a base station that serves the second cell.

11. The apparatus of claim 5, wherein the processor is configured to execute machine readable instructions; and
the apparatus further comprises a memory device coupled to the processor, wherein the memory device stores the machine readable instructions.

12. A method of controlling a switching of a user device from a first cell to a second cell in a wireless network, the method comprising:
determining whether speed information corresponding to a velocity of the user device meets a first threshold that was determined based on a size of the second cell;
determining whether the size of the second cell meets a cell size criterion; and
when it is determined that (i) the speed information meets the first threshold and (ii) the size of the second cell meets the cell size criterion,
adjusting at least one of (i) a handover parameter or (ii) a cell reselection parameter in order to decrease a probability that the user device will switch from the first cell to the second cell, wherein the adjusting includes increasing a T_reselectionRAT parameter corresponding to a second threshold to which a time duration is compared, the time duration corresponding to a time period in which a handover condition is satisfied.

13. The method of claim 12, wherein:
adjusting at least one of (i) the handover parameter or (ii) the cell reselection parameter further comprises:
changing a third threshold to which a measure of signal strength corresponding to the second cell is compared.

14. The method of claim 13, wherein the third threshold corresponds to a comparison of (a) a signal strength of the second cell with (b) a cumulative received power at the user device.

15. The method of claim 12, wherein adjusting at least one of (i) the handover parameter or (ii) the cell reselection parameter further includes:
lowering a priority associated with the second cell to a level below a level associated with the first cell.

16. The method of claim 12, wherein the speed information corresponds to a relative speed between the user device and the second cell.

17. The method of claim 12, wherein determining whether the size of the second cell meets a cell size criterion includes determining whether a transmit power of the second cell meets a transmit power criterion.

18. The method of claim 12, wherein the wireless network is a heterogeneous network in which the first cell has a size different than the size of the second cell.

19. An apparatus, comprising:
a processor configured to
determine whether speed information corresponding to a velocity of a user device meets a first threshold, wherein the user device is within a first cell of a wireless network, and wherein the first threshold was determined based on a size of a second cell in the wireless network,
determine whether the size of the second cell meets a cell size criterion, wherein the second cell is within or adjacent to the first cell in the wireless network, and
when it is determined that (i) the speed information meets the first threshold and (ii) the size of the second cell meets the cell size criterion,
adjust at least one of (i) a handover parameter or (ii) a cell reselection parameter in order to decrease a probability that the user device will switch from the first cell to the second cell, wherein adjusting at least one of (i) the handover parameter or (ii) the cell reselection parameter includes increasing a T_reselectionRAT parameter corresponding to a second threshold to which a time duration is compared, the time duration corresponding to a time period in which a handover condition is satisfied.

20. The apparatus of claim 19, wherein:
the processor is configured to adjust the at least one of (i) the handover parameter or (ii) the cell reselection parameter further by:
changing a third threshold to which a measure of signal strength corresponding to the second cell is compared.

21. The apparatus of claim 20, wherein the third threshold corresponds to a comparison of (a) a signal strength of the second cell with (b) a cumulative received power at the user device.

22. The apparatus of claim 19, wherein the processor is configured to adjust the at least one of (i) the handover parameter or (ii) the cell reselection parameter further by:
lowering a priority associated with the second cell to a level below a level associated with the first cell.

23. The apparatus of claim 19, wherein the processor is included in a base station that serves the first cell.

24. The apparatus of claim 19, wherein the processor is included in a base station that serves the second cell.

25. A method of controlling a switching of a user device from a first cell to a second cell in a wireless network, wherein the first cell is a pico cell, a femto cell, or a micro cell, the method comprising:
determining whether speed information corresponding to a velocity of the user device meets a threshold that was determined based on a size of the first cell;
determining whether the size of the second cell meets a cell size criterion corresponding to macro cells; and
in response to determining that (i) the speed information meets the threshold, and (ii) the size of the second cell meets the cell size criterion corresponding to macro cells,
handing over the user device to the second cell.

26. An apparatus, comprising:
a base station serving a first cell, wherein the first cell is a pico cell, a femto cell, or a micro cell, the base station configured to
determine whether speed information corresponding to velocity of a user device meets a threshold, wherein the threshold was determined based on a size of a first cell in the wireless network,
determine whether the size of the second cell meets a cell size criterion corresponding to macro cells, and
in response to determining that (i) the speed information meets the threshold, and (ii) the size of the second cell meets the cell size criterion corresponding to macro cells,
hand over the user device to the second cell.

* * * * *